Jan. 30, 1962   E. T. JOHNSON   3,018,598
MOWER ATTACHMENT
Filed May 4, 1959   3 Sheets-Sheet 1
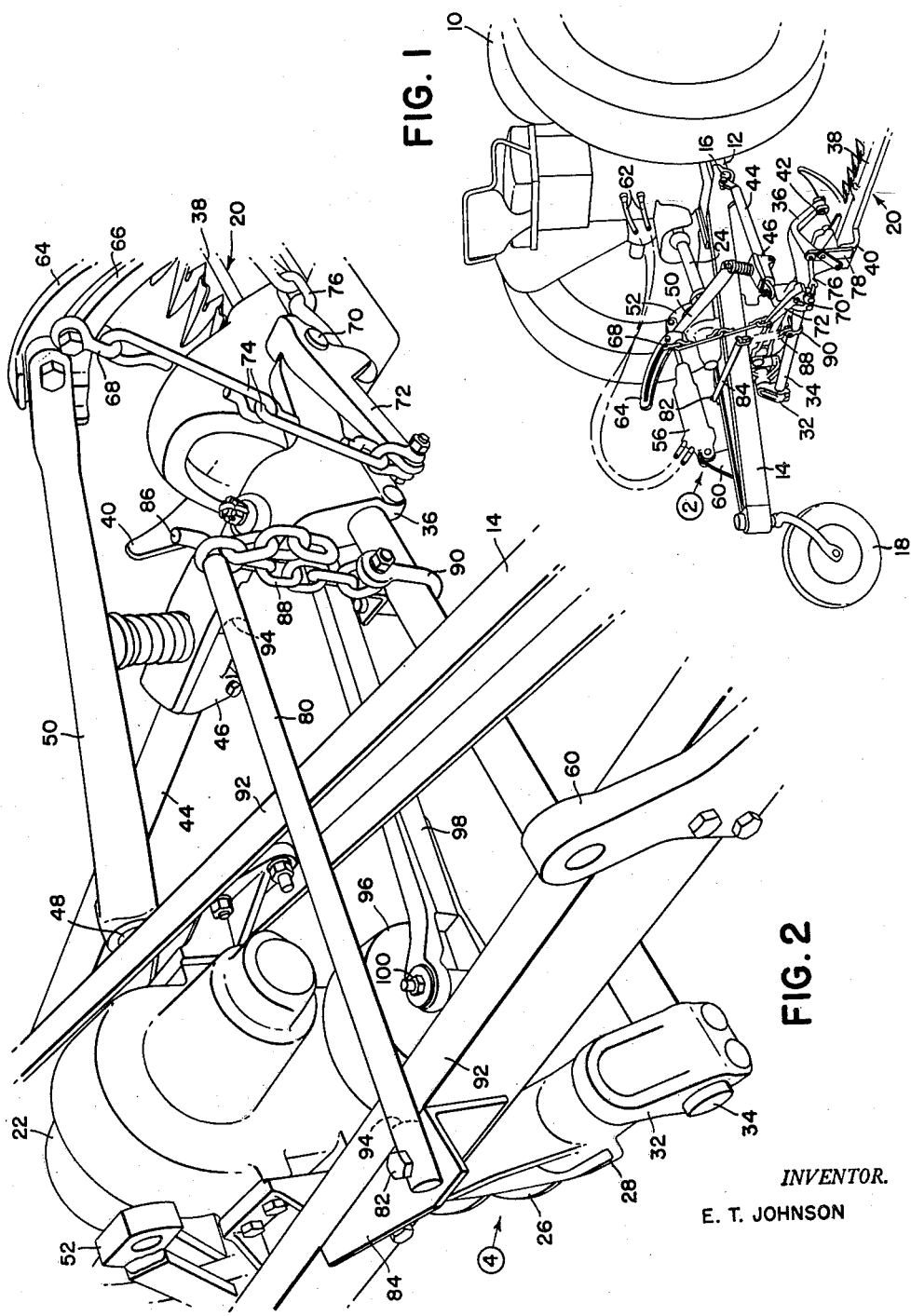
INVENTOR.
E. T. JOHNSON Jan. 30, 1962     E. T. JOHNSON     3,018,598
MOWER ATTACHMENT Filed May 4, 1959     3 Sheets-Sheet 2

INVENTOR.
E. T. JOHNSON

Jan. 30, 1962     E. T. JOHNSON     3,018,598
MOWER ATTACHMENT
Filed May 4, 1959             3 Sheets-Sheet 3
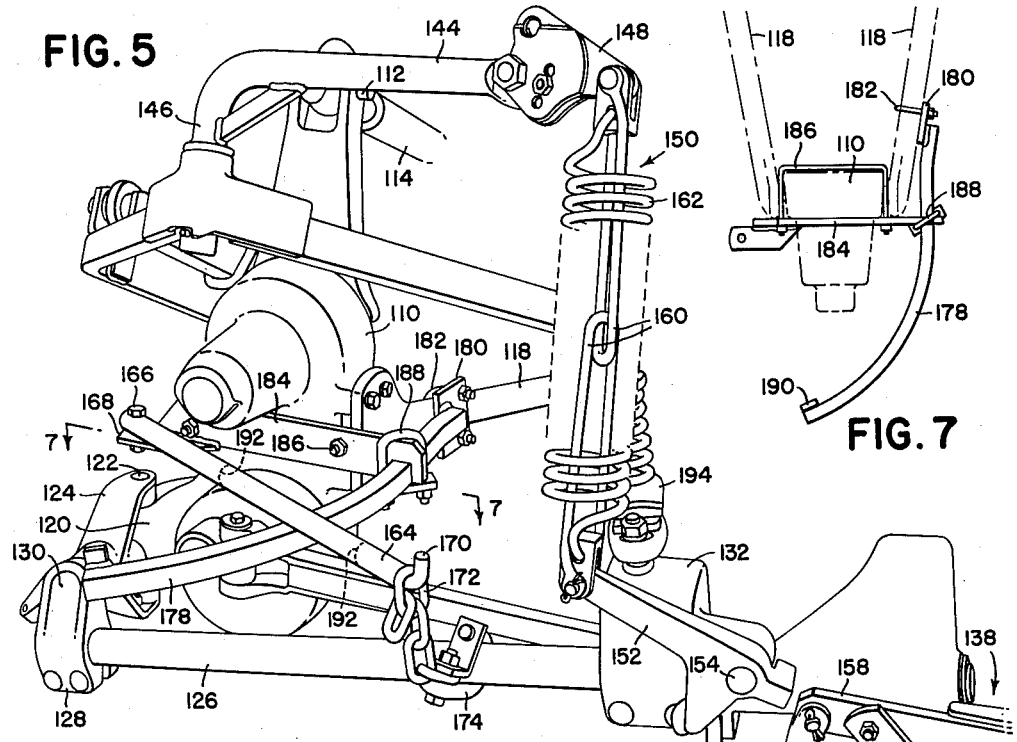
FIG. 5
FIG. 7
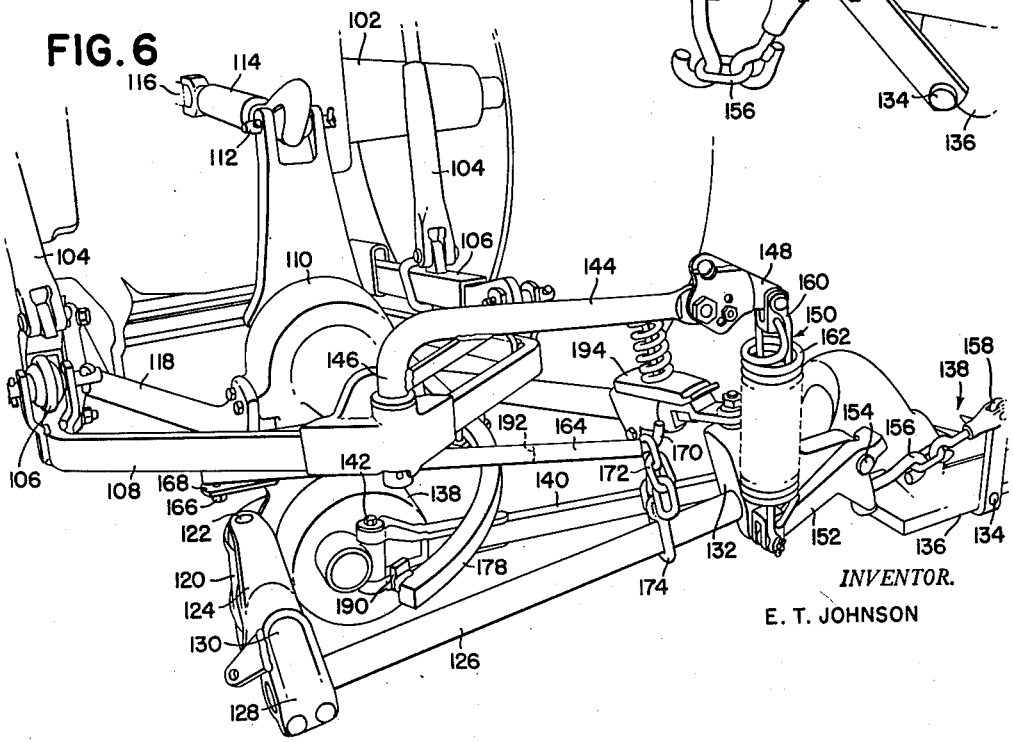
FIG. 6
INVENTOR.
E. T. JOHNSON United States Patent Office 3,018,598
Patented Jan. 30, 1962

3,018,598
MOWER ATTACHMENT
Ellsworth T. Johnson, Moline, Ill., assignor to Deere & Company, Moline, Ill., a corporation of Delaware
Filed May 4, 1959, Ser. No. 810,811
10 Claims. (Cl. 56—25)

This invention relates to a mower and more particularly to a high-cut mechanism adapting the mower to cut crops at heights above those at which the conventional cutting mechanism normally operates.

In a typical mower, a supporting frame is connected to or drawn by a tractor and includes obstruction-releasable cutter mechanism normally extending laterally to the right of the supporting frame and including inner and outer shoes which normally ride on the ground. Hence, the crop is cut at a height determined by the distance between the cutting level and the ground-engaging surfaces of the shoes. Lift mechanism on the supporting frame is connected to the cutter in a conventional manner for raising the cutter to a substantially vertical position, which is known as its transport positon. The lifting mechanism is so arranged that when the cutter bar is raised to its transport position, the inner shoe is also elevated above the ground. In mowers of this type, the normally laterally extending cutter is connected to the supporting frame by release mechanism so that when the cutter encounters an obstruction in the field, the release mechanism may release so that the cutter may swing rearwardly relative to the supporting frame. The operator may then back the machine until the obstruction is cleared, reconnect the cutter, and proceed. In mowers of this type, the lifting mechanism is arranged so as to accommodate rearward swinging of the cutter without disconnecting the lift mechanism or any of its components.

The present invention relates to a mower of the general character referred to above but provides means for supporting the cutter at a height above the normal cutting level, thus providing what may be regarded as a high-cut arrangement. In order that the obstruction-releasable characteristics of the mower may be completely exploited, it is desired that the cutter remain in its high-cut position even when it swings rearwardly after release following the encountering of an obstruction. Accordingly, it is the principal object of the present invention to provide means for supporting the cutter in all positons, whether normal operating position or rearwardly swung position after being released. It is a further feature of the invention to provide simple and novel means which may be readily connected to mowers of conventional construction so as to accomplish the foregoing object of maintaining the height of the cutter bar even during released position. In one form of the invention, it is a significant object to use a portion of the supporting frame as track means on which a supporting member may ride as the cutter bar swings between operating and released positions. In another form of the invention, it is an important object to provide added track means for supporting the swinging member which operates to carry the cutter in either its operating or released positions.

The foregoing and other important objects and desirable features inherent in and encompassed by the invention will become apparent as preferred embodiments of the invention are disclosed by way of examples in the ensuing description and accompanying sheets of drawings, the several figures of which are described below.

FIG. 1 is a fragmentary perspective of that form of the invention embodied in what is known as a tractor-connected trail-behind mower in which the rear end is supported by a caster wheel.

FIG. 2 is an enlarged fragmentary perspective as seen from the opposite side of FIG. 1, as indicated generally by the encircled numeral 2.

FIG. 5 is a perspective of the rear portion of a tractor-mounted mower embodying another form of the invention.

FIG. 6 is similar to FIG. 5 but shows the lift mechanism in its lowered position.

FIG. 7 is a schematic view, on a slightly reduced scale, as would appear were FIG. 5 cut by a plane indicated by the line 7—7 on that figure.

In that form of the invention illustrated in FIGS. 1, 2, 3 and 4, the rear part of a typical agricultural tractor will be recognized in FIG. 1 at 10 as having a drawbar 12 to which is connected a fore-and-aft supporting frame 14. The connection of the front end of the frame 14 to the drawbar 12 is pivotal as indicated generally at 16, and the rear end of the frame 14 is carried by a ground-engaging caster wheel 18, whereby the frame 14 may have vertical movement relative to the tractor as varying ground contour is encountered.

Figure 4:
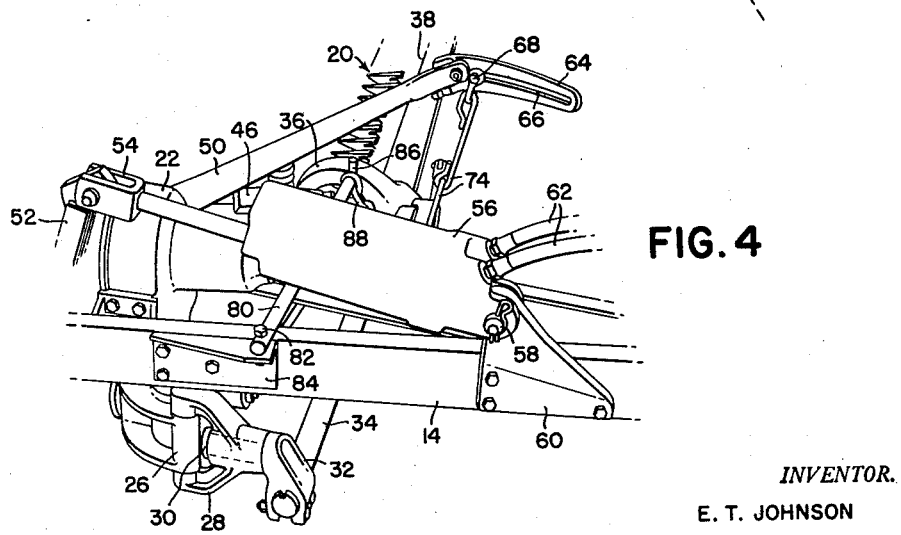
FIG. 4 is a fragmentary perspective, slightly reduced as respects FIGS. 2 and 3 but enlarged over FIG. 1, and illustrating the area of the mower indicated by the arrow bearing the encircled numeral 4.

As is conventional, the frame 14 generally trails the tractor and supports a cutter means, indicated in its entirety by the numeral 20, at the right hand side thereof. The cutter means in normal operating position extends normal to the line of advance. The frame 14 carries generally intermediate its front ends a suporting housing 22 which also contains drive gearing, not shown, connected to the tractor by a propeller shaft 24 (FIG. 1). As best shown in FIG. 4 the housing 22 has a depending portion 26 which affords a vertical pivotal connection with a yoke 28. The yoke in turn has a fore-and-aft bearing for supporting a pivot pin 30 which has integral therewith at its rear end a clamp 32 which rigidly receives the inner or left hand end of a drag bar 34. The drag bar 34 extends normally directly to the right and has rigidly secured to its outer end a shoe-supporting yoke 36, and the cutter 20 comprises a cutter bar 38 having an inner shoe 40 pivoted to the yoke 36 on a fore-and-aft axis at 42. The cutter bar 38 extends laterally to the right as an extension of the drag bar 34. This defines the normal operating position of the cutter, and this position is maintained by a telescopic release link mechanism 44 which may be of any conventional construction, that shown comprising a pair of separable parts normally maintained in coupled relation by spring pressed latch means 46. The specific type of release means 44—46 is merely representative of many that could be employed and does not affect the scope of the invention.

From the description thus far, it will be apparent that the cutter bar 38 can pivot relative to the outer yoke 36 about the fore-and-aft pivot at 42; additionally, the drag bar 34 may pivot relative to the supporting frame about the fore-and-aft axis afforded by the inner pivot pin 30. Hence, the cutter mechanism as a whole is enabled to change position as varying ground contour is encountered. Should the cutter bar encounter an obstruction during advance of the machine, the forces involved will cause release of the mechanism 44—46, with the result that the cutter as a whole, comprising the drag bar 34 and cutter bar 38, will swing rearwardly about the inner upright pivot afforded at 26. To this extent, the structure illustrated is typical and does not in and of itself limit the invention.

Lift means is provided for raising and lowering the cutter bar 38 and this involves also an arrangement in which the drag bar 34 is moved vertically about its foreand-aft pivot at 30. In the present case, the lift mechanism comprises a transverse rockshaft 48 suitably journaled on the frame 14 and having at its right hand end a rearwardly and outwardly extending lift arm 50. This arm is rigidly secured to the rockshaft 48 so as to turn therewith. The rockshaft 48 carries rigidly at its other end a force-receiving arm 52 to which the piston clevis 54 of a power cylinder 56 is connected. The cylinder is anchored at 58 to a bracket 60 rigidly secured to one side of the frame 14. The connection 58 is removable, as is the connection between the piston clevis 54 and the arm 52, whereby the cylinder may be removed for use with other implements. This is not material to the present invention, but is mentioned merely for the purpose of explaining the absence of the power cylinder in FIGS. 2 and 3, plus the fact that the removal of the cylinder enables a better view of the structure involved at the left hand side of the frame 14. The cylinder 56 is of the hydraulic type and is powered from any conventional source on the tractor (not shown) as via a pair of hose lines 62. It will be obvious that extension and retraction of the cylinder 56 will rock the rockshaft 48 and consequently will raise and lower the lift arm 50.

The outer or free end of the lift arm 50 has rigid thereon a rearwardly and inwardly curved extension 64 provided with a slot 66 in which a clevis 68 is free to ride between the fore and aft limits established by the closed ends of the slot. The rear portion of the outer yoke 36 has pivoted thereon at 70 on a fore-and-aft axis a gag lever 72 which has its inner end connected by a pair of links 74 to the clevis 68. The gag lever 72, as is conventional, is connected by a link 76 to an arm 78 rigid on the inner shoe 40 of the cutter bar 38. The arrangement is such that when the rockshaft 48 is rocked in a counterclockwise direction as seen in FIG. 2 (clockwise as seen in FIG. 1) the linkage 74 operates in tension to swing the gag lever 72 clockwise as seen in FIG. 2, thereby causing the cutter bar 38 to swing upwardly about its pivot 42 to the outer yoke 36. This will raise the cutter bar 38 toward its transport position. As is well known to those skilled in the art, the gag lever and associated linkage arrangement involves a stop which becomes effective after predetermined upward movement of the cutter bar 38 so that the cutter bar 38 and outer yoke 36 become rigid, whereby further upward rocking of the lift arm 50 causes the drag bar 34 to swing upwardly about its pivot 30 to the inner supporting yoke 28. The purpose of the arcuate extension 64 on the lift arm 50, and the clevis 68 riding therein, is to enable the lift connection 74 to remain connected when the cutter bar swings rearwardly about its inner upright pivot at 26. Hence, when the cutter bar is restored to normal operating position after the obstruction has been cleared, the lift mechanism is still effective. This to a large extent is representative of known constructions.

Figure 3:
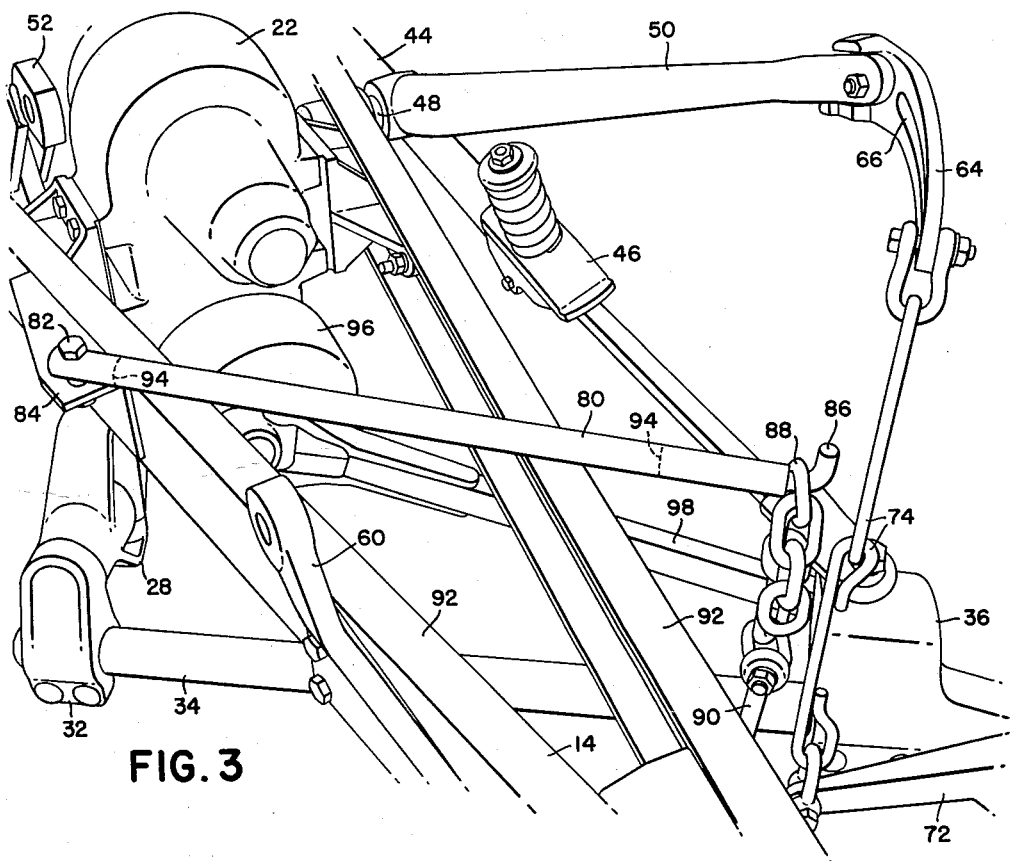
FIG. 3 is a view similar to FIG. 2 but shows the mechanism in the condition it will assume when the cutter is swung rearwardly after encountering an obstruction.

As previously indicated, the normal mower operates in cutting position with the inner shoe 40 riding the ground, so that the cutter bar 38 is at a ground-proximate level and consequently cuts the crops at or near the ground. In many cases it is desired to cut the crop at a high level and for this purpose some means must be provided for supporting the cutter bar at such desired level. In the past, known means for this purpose resided largely in the use of wheels at the inner and outer shoes. According to the present invention, the need for such additional wheels is eliminated by the provision of a high-cut mechanism which serves the same purpose but does it in a better fashion. In that form of the invention shown in FIGS. 1–4, the high-cut mechanism comprises a cross member or supporting bar 80 having its inner end pivoted at 82 on a vertical or upright axis to a supporting bracket 84 rigidly carried on the left hand side of the frame 14. As best seen in FIGS. 2 and 3, the supporting bracket 84 and consequently the upright pivot 82 are closely proximate to the upright pivot 26 between the cutter and the supporting frame 14. The bar 80 normally extends laterally to an outer hooked or upturned outer end 86 which is connected by means including a chain 88 and clevis 90 to an outer portion of the drag bar 34. The bar 80 rides directly on upper surface portions 92 of the members making up the frame 14, and these surfaces may be considered track means for sustaining the bar 80. For the purposes of improving the performance of the bar 80, it may be heat treated in a portion of its length coextensive with the width between the frame members having the surfaces 92, with somewhat increased length in the heat treatment at the outer end because of the fact that when the bar 80 swings rearwardly about the pivot 82 on the surfaces 92, the outer end portion of the bar increasingly engages the surfaces 92. The area of the bar that is heat treated may be regarded as represented by the distance between the dotted lines 94 on the bar as seen in FIGS. 2 and 3.

When the cutter bar is in its normal high-cut operating position, extending laterally at the side of the frame 14, the linkage or tension means 88 serves to suspend the drag bar 34 in an elevated position, which is adjustable because of the selection afforded by the links in the chain 88. Because of the conventional stop mechanism in the gag lever means, previously referred to, the cutter bar 38 will stop in a horizontal position substantially as a horizontal extension of the supported drag bar 34, since its weight creates tension in the linkage 76 which in turn pulls the gag lever 72 counterclockwise to a point where it stops against the yoke 36. In other words, the shoe 40 will not ride the ground and consequently the cutter will cut at a level above the ground determined by the distance at which the drag bar and cutter bar are supported by the means 88 from the outer hooked end 86 of the cross member or bar 80.

One distinct advantage of the arrangement just described is that it is simple and convenient and may be readily mounted on mowers of existing constructions. A further significant advantage is that since it is pivoted at 82 and since it supports the drag bar 34 adjacent to its outer end, the high position of the cutter will be maintained even though the cutter swings rearwardly, because the bar 80 will ride on the track means afforded by the surfaces 92. Further, when the cutter is restored to its normal operating position, the bar 80 will swing back to its orignal normal position, all without changing or in any way affecting the supported relationship between the bar 80 and the high-cut cutter. The normal operating position of the cutter bar 80 is shown in FIG. 2, and the rearwardly swung position is shown in FIG. 3.

The cutting mechanism is driven from the mechanism (not shown) in the housing 22 in the conventional fashion, such as by a fly wheel 96 and pitman 98, the connection between the fly wheel and pitman including a typical universal joint at 100 to accommodate variations in positions of the parts as they move through their relative ranges as indicated before.

In that form of the invention shown in FIGS. 5–7, a modified arrangement adapts the invention to a direct tractor-mounted mower of the type shown, for example, in the U.S. patent to Dort 2,854,803. The rear portion of a typical agricultural tractor is visable at 102 in FIG. 6 and this includes lift linkage 104 for supporting a pair of rearwardly extending draft links 106, the same affording what is conventionally known as a three-point hitch. The mower includes a supporting frame 108 carried in part by the draft links 106 and including a central gear housing 110 having its upper end pivotally connected at 112 to a top link 114 which has its forward end anchored to the tractor at 116. These details are shown in the above-identified Dort patent.

The housing 110 has a pair of forwardly diverging support arms 118 which are suitably connected to forward portions of the draft links 106, and here again these details are adequately illustrated in the Dort patent.

The housing 110 has a depending portion 120 which affords a vertical pivot 122 for connection to the inner yoke 124 of means for supporting a transverse drag bar 126. The drag bar is rigidly clamped to a member 128 which has a pivotal connection on a fore-and-aft axis to the yoke 124 in the same manner as the pivot afforded by the member 30 in FIGS. 1–4. This pivot in FIGS. 5 and 6 is indicated as being in the area of the free end of the lead line of the numeral 130.

The outer end of the drag bar 126 is rigidly connected to an outer yoke 132 and this yoke has a pivotal connection on a fore-and-aft axis at 134 to the inner shoe 136 of a cutter indicated in its entirety by the numeral 138. This cutter may be regarded as conventional, or at least similar to that previously described. The housing 110 contains gearing (not shown) which effects a drive to the cutter as via a fly wheel 138 and pitman 140, a universal joint at 142 being again utilized as the connection between the fly wheel and pitman so as to accommodate relative movements between the parts. The mechanism in the housing 110 is driven in conventional fashion from the power take-off (not shown) of the tractor.

The cutter 138 is raised and lowered by lift means including a lift arm 144 having its inner end provided with an upright elongated bearing connection 146 to a rear central portion of the mower frame 108. The bar 144 normally extends laterally in overhanging relationship to the outer yoke 132 and in that area has rigid at its outer end a connecting member 148 connected by tension means 150 to a gag lever 152 on the yoke 132. Here again, the gag lever mechanism may be conventional and includes a pivotal mounting at 154 for the gag lever and linkage at 156 connected to the cutter bar inner shoe. The arrangement, as pointed out in the Dort patent, identified above, is such that when the lift linkage 104 is elevated to raise the mower frame 108, the lift means 150 will pivot the gag lever 152 in a clockwise direction as seen in FIGS. 5 and 6, causing the cutter bar and inner shoe 136 to swing upwardly relative to the drag bar 126. At a predetermined point, the gag lever mechanism incorporates a stop which generally rigidifies the connection between the yoke 132 and shoe 136, whereupon the cutter and a drag bar move in unison upwardly about the pivot 130. The connection of the linkage 156 from the gag lever to the inner shoe is effected by an arm 158 rigid on the inner shoe. The linkage means at 150 incorporates a pair of links 160 encircled by a tension spring 162 which effects a floating lift with a fixed stop determined by engagement between the links 160. This lift means could be replaced by any other suitable means.

The adaptation of the high-cut mechanism to the mower, so as to enable support of the cutter 138 at a level above the ground, without the use of wheels or similar supporting means, includes a supporting bar or cross member 164 having its inner end pivoted on an upright axis at 166 to a suitable supporting bracket 168 rigid on the housing 110. This bar is similar to that previously described at 80 and has an outer upturned or hooked end 170 which is connected by means including a chain 172 to a clevis 174 on the outer portion of the drag bar 126, with which the outer end of the bar 164 has an overhanging relationship. The bar is supported by track means comprising a rigid arcuate steel member 178 rigidly supported by the frame structure 118—110. In the specific form illustrated, the bar 178 has at its forward end a rigid flange member 180 which is connected by a U-bolt 182 to the proximate frame member 118. A cross-bar 184 is connected by a U-bolt 186, which embraces the gear housing 110, so as to be rigidly supported. The bar 184 extends to the right and intersects the forward portion of the arcuate bar or member 178, and another U-bolt 188 is used at this point to effect the rigid connection. The arcuate member 178 has a stop 190 at its rear end for purposes of limiting rearward swinging of the cross member or supporting bar 164. The bar 164 may be heat treated at an intermediate portion between its ends as indicated by the area defined by the dotted lines 192. This improves the wear characteristics of the structure as the bar 164 slides back and forth on the arcuate member 178 during release and repositioning of the cutter 138. The normal operative position of the cutter is maintained by release mechanism of any conventional type, indicated in its entirety by the numeral 194.

In both forms of the invention, the high-cut mechanism is of simple construction yet perfectly adequate for performing the desired function. The arrangement in each case is such that it remains effective during changes in position of the cutter bar between normal operative position and rearwardly swung released position. Both designs are formulated on the basis of attachment to mowers of existing types; although, the principles of the invention may be exploited by building same into mowers of different designs.

Features and advantages of the invention, other than as noted herein, will readily occur to those versed in the art, as will many modifications and alterations in the preferred embodiments disclosed, all of which may be achieved without departure from the spirit and scope of the invention.

What is claimed is:

1. High-cut mechanism for a mower having a generally fore-and-aft frame, an obstruction-releasable cutter means swingable rearwardly relative to the frame about an upright axis on the frame from a normal lateral cutting position and also vertically swingable relative to the frame for adjustment as to cutting height, and lift means on the frame for swinging the cutter means vertically, said mechanism comprising: a cross member having inner and outer ends and including upright pivot means at its inner end mountable on the frame adjacent to the aforesaid upright axis to extend normally laterally with its outer end in overhanging relation to the cutter means; track means rigid on the frame between the inner and outer ends of the cross member and sustaining said member for fore-and-aft swinging about said pivot means; and means connected directly between the outer end of the cross member and the cutter means for suspending the cutter means at an elevated cutting height spaced above the ground.

2. The invention defined in claim 1, in which: the track means is an integral part of the frame.

3. The invention defined in claim 1, in which: the track means is a separate element rigidly secured to the frame.

4. The invention defined in claim 1, in which: the cross member is heat-treated intermediate its ends in the portion thereof sustained by the track means.

5. The invention defined in claim 1, in which: the track means is arcuate about the pivot means.

6. The invention defined in claim 1, in which: the pivot means includes bracket means rigidly mountable on the frame and an upright pivot pin supporting the cross member and the track means is a rigid element separate from the frame and rigidly supported by the bracket means.

7. The invention defined in claim 1, in which: the last-named means is adjustable as to length so as to enable variations in the height of the cutter means.

8. High-cut mechanism for a mower having a generally fore-and-aft frame including a drive housing and a fore-and-aft support secured to the housing, an obstruction-releasable cutter means swingable rearwardly relative to the frame about an upright axis on the housing from a normal lateral cutting position and also vertically swingable relative to the frame for adjustment as to cutting height, and lift means on the frame for swinging the cutter means vertically, said mechanism comprising: bracket means having securing means for the mounting thereof rigidly on the housing, said bracket means including an upright pivot proximate to the aforesaid axis; a rigid track on and extending rearwardly from the bracket means and spaced from the pivot in the direction of the cutter means and at a level above that of the cutter means; a cross member having inner and outer ends and mounted at its inner end on the pivot and extending laterally over and sustained by the track with its outer end in overhanging relation to the cutter means; and means connected directly between the outer end of the cross member and the cutter means for suspending the cutter means at an elevated cutting height spaced above the ground.

9. The invention defined in claim 8, in which: the bracket means includes a transverse element crosswise of the housing and the securing means includes U-bolt means embracing the housing and connected to the support; and the track is rigidly secured to said element and has a forward extension portion projecting ahead of the element and provided with means thereon for mounting on the fore-and-aft support.

10. The invention defined in claim 8, in which: the bracket means includes a transverse element crosswise of the housing and the securing means includes U-bolt means embracing the housing and connected to the support.

References Cited in the file of this patent

UNITED STATES PATENTS

| | | |
|---|---|---|
| 2,275,259 | Johnson et al. | Mar. 3, 1942 |
| 2,277,844 | Clapper | Mar. 31, 1942 |
| 2,292,962 | Mott | Aug. 11, 1942 |
| 2,299,841 | Moyer | Oct. 27, 1942 |
| 2,318,274 | Westerlund | May 4, 1943 |
| 2,854,803 | Dort | Oct. 7, 1958 |
| 2,880,562 | Vutz | Apr. 7, 1959 |